I. FREEMAN.
PLOW.
No. 169,799. Patented Nov. 9, 1875.
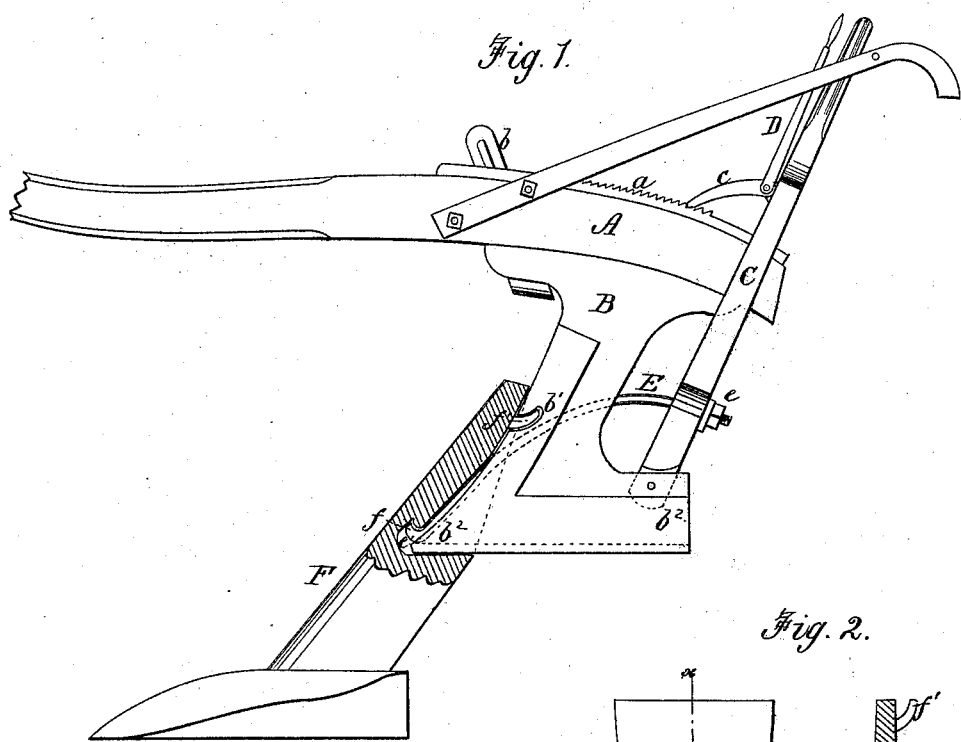
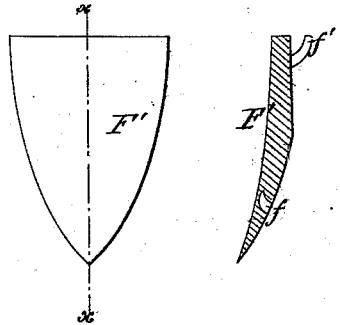
WITNESSES:
W. W. Hollingsworth
Colon C. Kennon
INVENTOR:
Irvin Freeman
BY
ATTORNEYS.

UNITED STATES PATENT OFFICE.

IRVIN FREEMAN, OF CORPUS CHRISTI, TEXAS.

IMPROVEMENT IN PLOWS.

Specification forming part of Letters Patent No. 169,799, dated November 9, 1875; application filed September 11, 1875.

*To all whom it may concern:*

Be it known that I, IRVIN FREEMAN, of Corpus Christi, in the county of Nueces and State of Texas, have invented a new and Improved Plow; and I do hereby declare that the following is a full, clear, and exact description of the same, reference being had to the accompanying drawing, forming a part of this specification, in which—

Figure 1 is a side elevation, partly in section; and Fig. 2, a detail view of shovel in front and sectional elevation.

The invention will first be fully described in connection with drawing, and then pointed out in claim.

A represents a plow-beam, on the top surface of which is fastened the rack-plate $a$, and B a skeleton plow-frame, fastened to the beam by an end-slotted piece, $b$, and having the open grooves $b^1 b^1$. C is a lever pivoted to the heel $b^2$, and having the pawl $c$, that works in the rack $a$. D is a lift-rod attached to pawl $c$, and extending up within easy reach of the plowman. E is a curved rod, threaded at one end to receive a nut, $e$, behind the lever, and having a hook, $e'$, that fits into the shank-recess $f$ of a shovel-plow, F.

After placing the toe $b^3$ and hook $e'$ in the recess $f$, while the hooks $f' f'$ enter the recesses $b^1$, the lever C is carried backward until the parts B F are firmly held together, and then locked by the pawl $c$, that catches in a tooth of rack $a$. The shovel F' can be locked and held on the skeleton frame B in a similar manner.

This mode of fastening a subsoiler or shovel to the skeleton frame is found, in practice, to be very easy and convenient.

Having thus described my invention, what I claim as new is—

The combination, with hook-rod E, holding shovel or subsoil plow to skeleton frame, of the lever C, having pawl $c$, working in the beam-rack $a$, as and for the purpose specified.

IRVIN FREEMAN.

Witnesses:
SOLON C. KEMON,
CHAS. A. PETTIT.